United States Patent [19]
Mangalam

[11] Patent Number: 6,123,296
[45] Date of Patent: Sep. 26, 2000

[54] SELF-ACTUATED FLOW CONTROL SYSTEM

[75] Inventor: Sivaramakrishman M. Mangalam, Williamsburg, Va.

[73] Assignee: Tao of Systems Integration, Inc., Williamsburg, Va.

[21] Appl. No.: 09/082,995

[22] Filed: May 21, 1998

[51] Int. Cl.[7] .................................................. B64C 21/00
[52] U.S. Cl. ........................ 244/204; 244/206; 244/213; 244/217
[58] Field of Search .................................. 244/204, 206, 244/213, 203, 200, 217

[56] References Cited

U.S. PATENT DOCUMENTS

| | | | |
|---|---|---|---|
| 1,979,184 | 10/1934 | Ziegler | 244/204 |
| 2,267,927 | 12/1941 | Kightlinger | 244/40 |
| 2,852,211 | 9/1958 | Xenakis | 244/213 |
| 3,184,186 | 5/1965 | Ikai et al. | 244/213 |
| 5,772,155 | 6/1998 | Nowak | 244/213 |

*Primary Examiner*—J. Woodrow Eldred
*Attorney, Agent, or Firm*—Kaufman & Canoles

[57] ABSTRACT

Arrays of microslats operating within the boundary layer of an aircraft wing or other surfaces are provided. The arrays consist of rows of microslats, staggered between rows, and shaped so that the trailing edge of the microslat is normal or perpendicular to the direction of expected reverse flow on the surface. For flow regions having directionally stable flow, the microslats are rectangular. Where the direction of the expected reverse flow is variable, the trailing edge of the microslats is triangular, thereby accepting an angular range of reverse flow. Each microslat operates independently through a hinge on its leading edge and an individual spring which holds the microslat flush to the aerodynamic surface until actuated by reverse flow. Where the boundary layer is expected to thicken, i.e., downstream along a surface, the arrays are formed with two layers of microslats, smaller microslats in a top layer and larger in a bottom layer. By this arrangement, while the boundary layer is thin, only the top layer is actuated, but as the boundary layer grows larger, the second layer is actuated, thereby restricting reverse flow even in thick boundary layers.

10 Claims, 8 Drawing Sheets

SELF-ACTUATED FLOW CONTROL SYSTEM

FIELD OF THE INVENTION

The invention is related to the airfoil flow device field and in particular to control devices acting within the airfoil boundary layer.

BACKGROUND OF THE INVENTION

Flow control around airfoils and wing sections is accomplished by two types of devices, those devices controlling the main flow and those controlling the boundary layer flow. The main flow devices include the airfoil shapes, flaps and flight control surfaces, such as ailerons, while the boundary layer control devices typically include wing fences, blowing or suction devices, vortex generators and the like. Although the main flow control devices produce the large scale effects which provide the necessary flight characteristics, often it is necessary to incorporate boundary layer control devices in order to allow the main flow devices to operate. For example, one can observe the presence of a large number of vortex generators mounted upstream of the trailing-edge flaps and ailerons on the wings of commercial aircraft. These devices are necessary to achieve high-lift characteristics during take-off and landing where the large flap deflections tend to cause extensive flow separation on the main wing. The absence of these boundary layer control devices results in much reduced lift because the trailing-edge flaps operate in an extensive separated flow region. While the vortex generators provide improvement in lift during the landing and take-off phases of flight, such devices are sources of drag throughout the remaining flight regime. This drag is caused by both form drag from the blockage caused by the device itself and by viscous drag, due to turbulent flow skin friction downstream of the device. Efforts to overcome these shortcomings include flap-mounted micro-vortex generators which extend and retract as the flaps are actuated. Shortcomings remain however, as the extension and retraction adds complexity and further provides no boundary control of the main wing when flaps are not extended. This interlinking of flaps and boundary layer control device means, for example, that an emergency flap-failure landing must be made at even higher approach and touch down speeds because both flaps and boundary layer control devices have been lost.

Additionally, many required applications of boundary layer control devices do not lend themselves to retractable vortex generators. For example, typical fixes for jet engine inlet flow problems have relied on inside-the-inlet vortex generators to mix the flow and prevent choked and stalled flow. Depending on the problems, such an installation may be extensive. An example is the General Dynamics F-111 swing wing fighter which had severe problems with engine stall associated with the poor flow through the inlet duct in the root section of the swing wing. The initial fixes included the installation of hundreds of vortex generator blades two to three inches long, around and along the inlet walls. This type of fix, although correcting the main flow problem, created a large boundary within the inlet duct greatly reducing its effective diameter. A boundary layer control device is needed which can operate passively, which will not include form drag or skin friction when boundary layer control is not needed, which will provide minimal blockage of the flow, and which operates independent of any control surfaces (flap, aileron, nozzle control, etc.)

SUMMARY OF THE INVENTION

It is an object of this invention to provide a boundary layer control device which has minimal form blockage when not in use.

It is another object of the invention to provide a boundary layer control device which operates independent of the actuation of any flight control surface.

It is yet another object of the invention to provide a boundary layer control device which reduces retrograde boundary layer flow.

It is still another object of the invention to provide a self-actuated boundary layer control device which operates based on local flow conditions.

Accordingly, the invention is a self-actuated boundary layer control device comprising a plurality of microslats in varying shapes, sizes and layers. The microslats are arranged in contiguous rows located at particular flow locations on a wing surface such as directly upstream of an aileron or flap. The microslat is made of a composite or plastic material and is hinged on the leading edge using a submerged hinge. A weak closing spring is attached to each microslat to bias the microslat to the closed (or flush) position. During flight operations, as the wing surface develops a negative pressure gradient (operating at high angles-of-attack), the retrograde flow in the boundary layer causes the microslats to open, thereby restricting retrograde flow and delaying the onset of flow separation. Depending on the wing planform, for example, a highly swept wing, the alignment of the microslats is set so that spanwise flow will be restricted. Flow conditions are determined at high angle-of-attack flight just prior to flow separation. For downstream conditions, where boundary layer thickness can overcome the effect of the microslat, larger microslats are installed with the smaller slats mounted on the larger slats. For locations where directionally steady flow occurs, rectangular microslats are installed. In locations where the flow direction may be less stable, spanwise for example, the microslat planform is triangular with the apex providing a trailing edge. Another microslat planform which can be used with directionally less stable flow is an elliptic-shaped trailing edge. These planforms provides faster actuation from retrograde flow from various angles.

BRIEF DESCRIPTION OF THE DRAWINGS

The foregoing objects and other advantages of the present invention will be more fully understood from the following detailed description and reference to the appended drawings wherein.

DETAILED DESCRIPTION OF THE INVENTION

Figure 1:
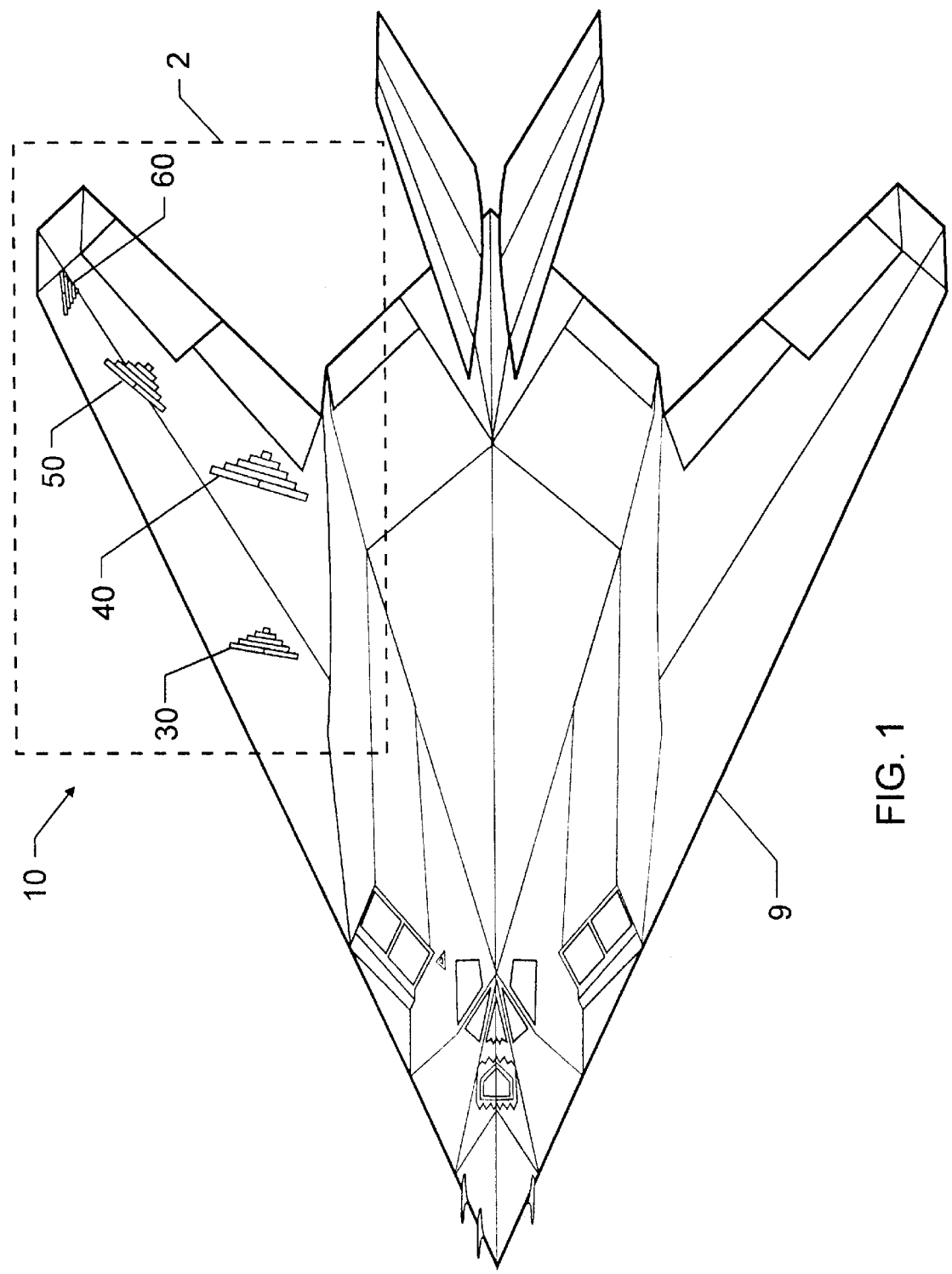
FIG. 1 is a top view of a fighter aircraft showing typical wing locations of the self-actuated, micro-adaptive flow control system.

Referring now to FIG. 1, the self-actuated, micro-adaptive flow control system of the present invention, designated generally by the reference numeral 10, is shown located along the top surface of the wing of a representative aircraft 9. The self-actuated, micro-adaptive flow control system 10 is adapted to match boundary flow conditions expected at various locations on the wing surface. The forward wing root array 30 is a single layer, unidirectional flow device, that is, a single layer of rows of microslats are arranged having trailing edges normal to the expected flow direction. The rearward wing root array 40 comprises a dual-layered series of rows adapted to an expected thick boundary layer. Similarly, the mid-wing array 50 comprises microslats with angled trailing edges adapted for spanwise flow, whereas the tip array 60 is an array of rectangular microslats adapted for tip vortex flow. Representative flow patterns within dashed box 2 may be seen in FIG. 2.

Figure 2:
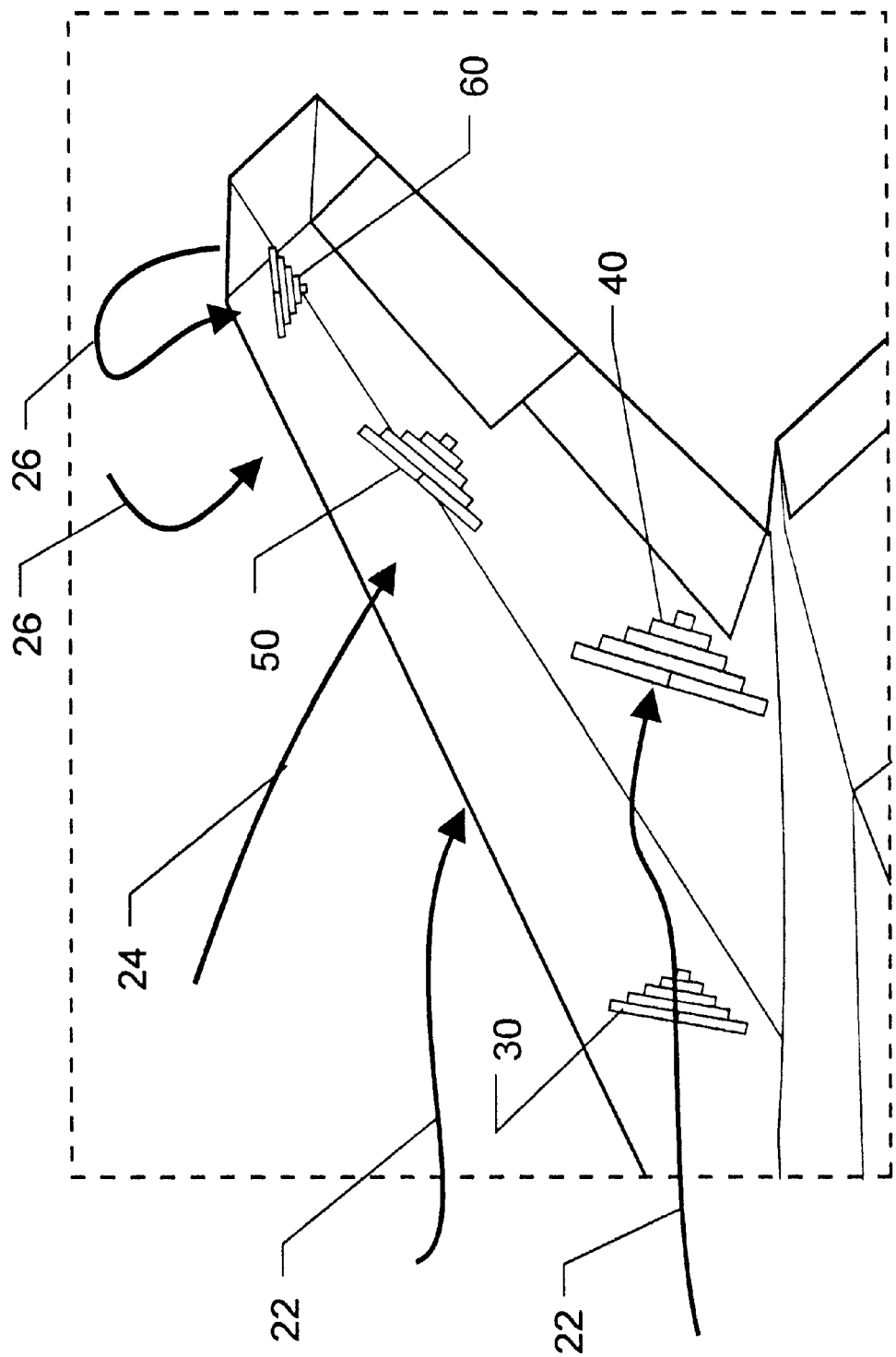
FIG. 2 is a partial top view showing a wing planform with airstream flow over the self-actuated, micro-adaptive flow control system.

Referring now to FIG. 2, the expected flow patterns at higher angles-of-attack are illustrated. Wing root streamlines 22 first cross the forward root array 30 where only a thin boundary layer is generated. Because the boundary layer is thin at this location, only the smaller microslats are needed. As the root streamlines 22 continue rearward on the wing, the boundary layer thickens. The self-actuated, micro-adaptive flow control system is adapted to this thicker boundary by larger microslats in a first layer and smaller microslats on a second layer mounted to the first layer as depicted by rearward root layer 40. Mid-wing array 50 is adapted to be activated by spanwise flow 24 which may come from a variable direction depending on angle-of-attack. At low angles, the flow will typically be angling spanwise toward the wing tip for a swept wing. However, at high angles-of-attack, vortex flow around the wing tip will typically cause inboard flow as shown by streamlines 24 and 26. A design feature of the invention is to present a trailing edge normal to the flow in order to counteract any reverse flow, that is, flow moving opposite to the main flow streamlines, 22, 24 and 26. Tip array 60 is located to counteract wing tip vortex flows, but remain closed during high speed, low angle-of-attack flight.

Figure 3:
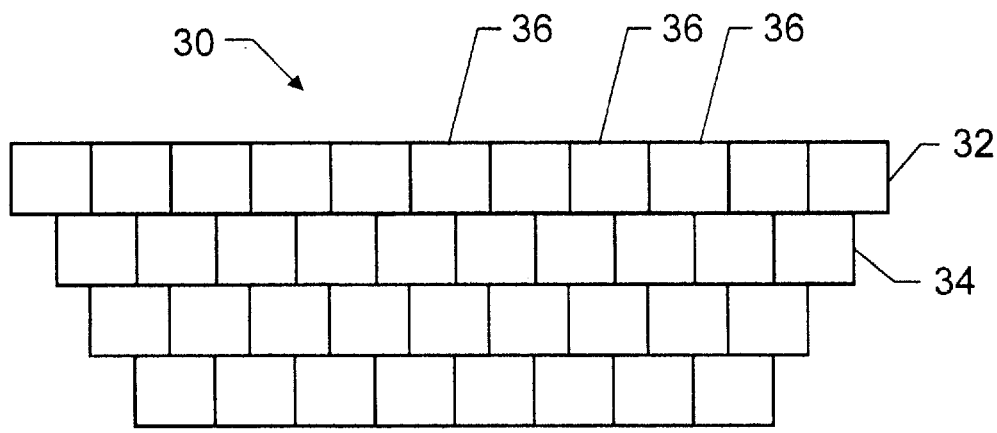
FIG. 3 is an enlarged top view of the self-actuated, micro-adaptive flow control system adapted for use in an aircraft surface location where the expected boundary layer is thin and the local flow direction is relatively fixed.
Figure 4:
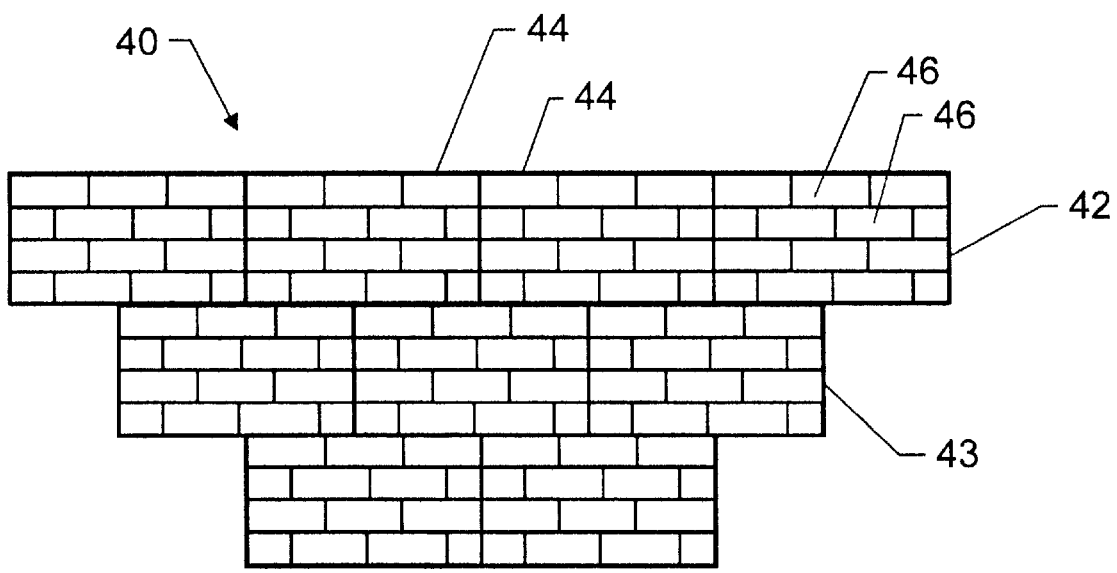
FIG. 4 is an enlarged top view of the self-actuated, micro-adaptive flow control system having layer microslats for use in an aircraft surface location where the boundary layer is relatively thick, but the local flow direction remains relatively fixed.

The details of the construction of the arrays may be seen in FIGS. 3 and 4. FIG. 3 depicts the single layer array having multiple rows (rows 32 and 34 called out) shown here as forward wing root array 30. Because the boundary layer is relatively thin at this forward chord position, the microslats 36 are smaller, or shorter in chord length. Also, because the boundary layer has a small height range, it is not necessary to provide layered microslats. The rearward wing root array 40, as shown in FIG. 4, is adapted for both thin and thick boundary layers necessary as flight conditions change on the rearward wing section. The microslats 44 are arranged in multiple rows (as depicted by rows 42 and 43), however, additional smaller microslats 46 are layered on top of the larger microslats 44. By this configuration, the rearward wing root array 40 is adapted to a thin boundary during which the smaller microslats 46 are activated, and a thick boundary, during which the larger microslats 44 are activated.

Figure 5A:
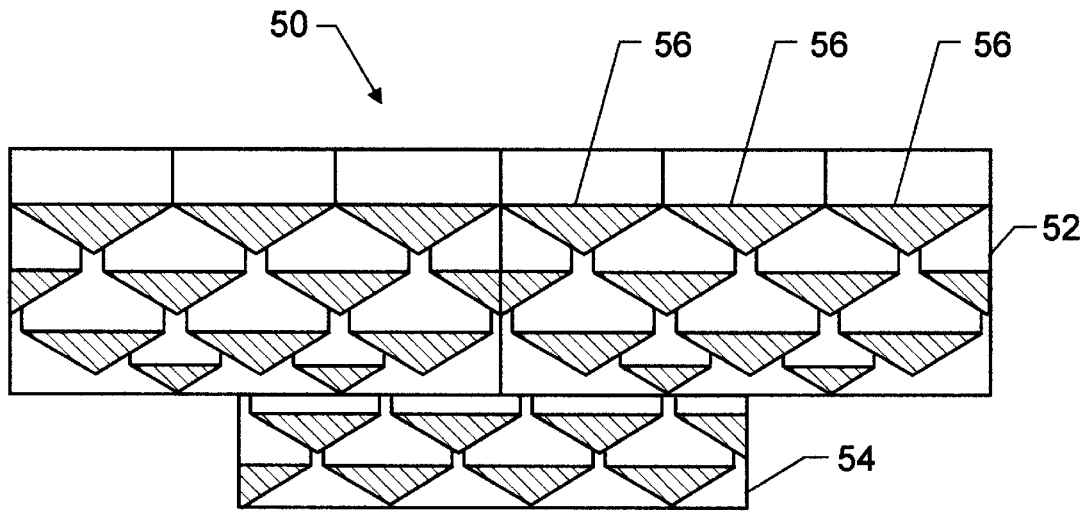
FIG. 5a is an enlarged top view of the self-actuated, micro-adaptive flow control system adapted for use in an aircraft surface location where the expected boundary layer is thin, but the local flow direction is variable due to changes in spanwise flow.
Figure 5B:
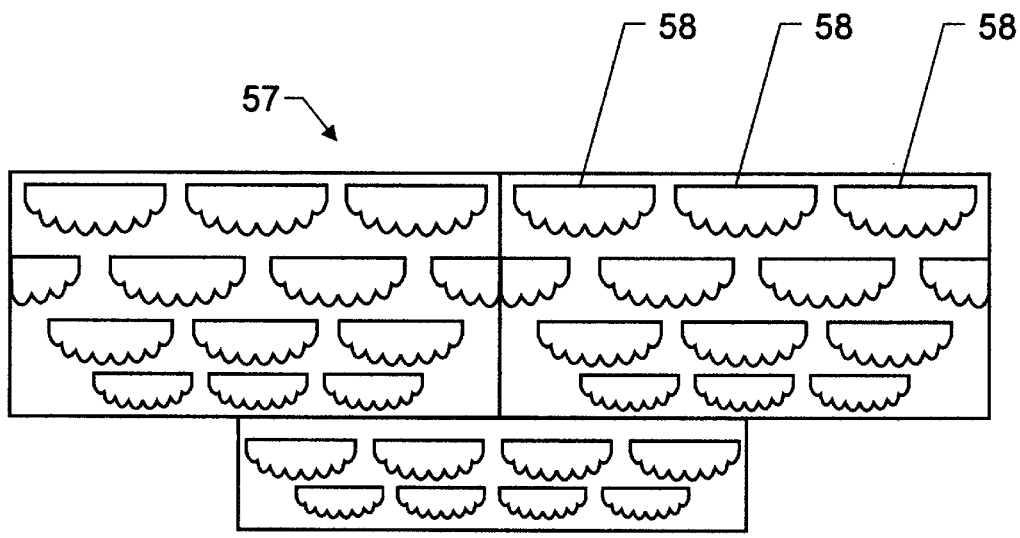
FIG. 5b is an enlarged top view of the alternate embodiment of the self-actuated, micro-adaptive flow control system adapted for use in an aircraft surface location where the expected boundary layer is thin, but the local flow direction is variable due to changes in spanwise flow.

FIG. 5a depicts the configuration of the mid-wing array 50 which the local airstreams are variable in direction. For best activation of the microslats 56, it is preferable to have the trailing edge of the microslats 56 normal to the expected reverse flow direction. By this means, the microslats open more quickly, thereby restricting reverse flow. As with the other arrays, mid-wing array 50 is arranged in multiple rows 52 and 54. An alternate mid-wing embodiment 57 is shown in FIG. 5b wherein the microslats 58 are formed with a serrated, elliptical trailing edge. The major axis of the elliptical slat is a hinge aligned normal to the mean expected flow, the elliptic trailing edge adapted for variations in the direction of reverse local flow.

Figure 6:
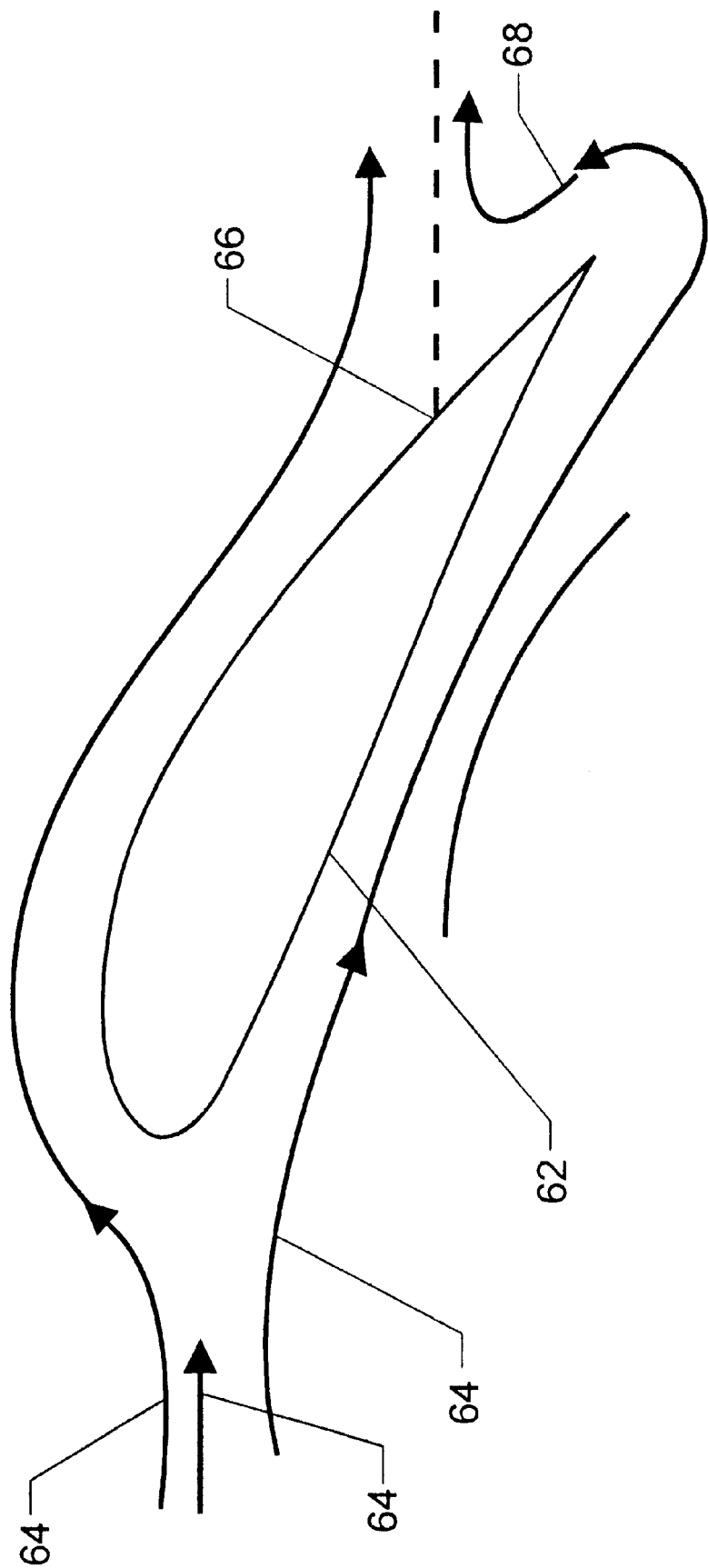
FIG. 6 is a side sectional view showing an airfoil at a stalling angle-of-attack with airflow streamlines depicting separated and reversed flow areas.

FIG. 6 depicts airflow around an airfoil 62 at a stall or near-stall angle-of-attack. Operating at this angle-of-attack, the main flow 64 separates from the wing leaving a separation point 66 and an area of reversed flow 68. As the wing becomes more fully stalled (at increasing angles-of-attack), the separation point 66 moves forward to the leading edge of the wing and the area of reversed flow 68 increases. In the wing areas just forward of control surfaces, such as flaps or ailerons, the stalling problem is especially severe. For example, a pilot maneuvering for landing, at relatively low airspeeds and corresponding high angles-of-attack may deflect an aileron to bank and turn the aircraft. The downward deflecting aileron is intended to lift the wing on the outside of the turn and bank the aircraft toward the inside of the turn. However, because the downward deflection of the aileron increases the angle-of-attack for that section of the wing, and increases the separated flow and stalled region, the aircraft can bank away from the turn (opposite to the direction commanded by the pilot). If the pilot reacts to this adverse motion by increasing control stick movement in an attempt to tighten the turn, the aircraft may flip completely upside down rolling away from the intended direction. Because of these dangerous circumstances, it is important that control surfaces do not stall while the main wing is still flying. The self-actuated, micro-adaptive flow control system is a device which can reduce stalling and separation during control deflection.

Figure 7:
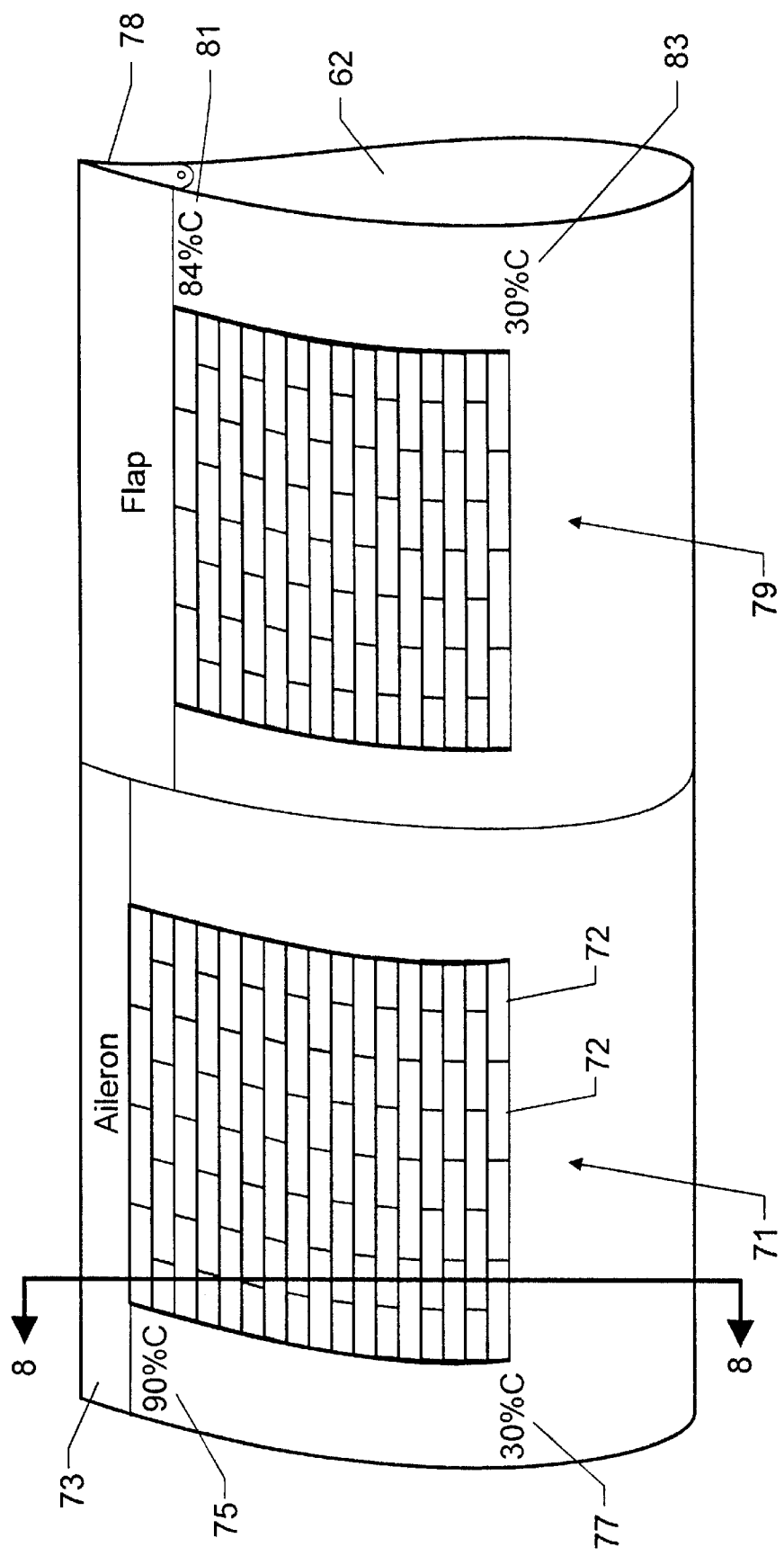
FIG. 7 is a top perspective view of a wing section showing the self-actuated, micro-adaptive flow control system installed upstream of flap and aileron surfaces.

Referring to FIG. 7, the self-actuated, micro-adaptive flow control is shown on airfoil 62, using an array 79 located on an airfoil 62 forward of a flap 78 and using the array 71 located on an airfoil 62 forward of an aileron 73 comprising rows of microslats 72 and an array 78 forward of the flap 81. The microslats 72 extend from the leading edge of the aileron 73, approximately the 90% chord position 75 forward to approximately the 30% chord position 77. Forward of the flap 81, the microslats extend from approximately the 84% chord 81 to the same forward location, 30% chord 83. Further details may be seen in cross-section 8 which appears in FIG. 8.

Figure 8:
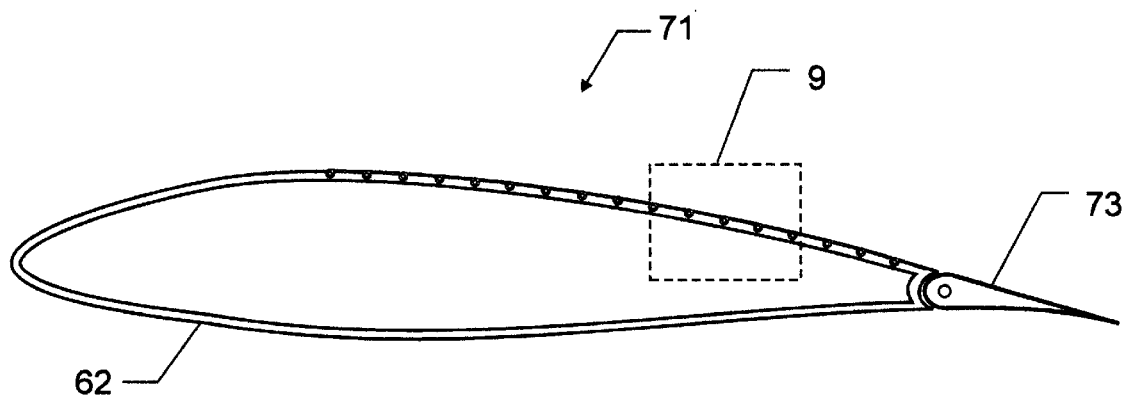
FIG. 8 is a sectional side view showing the self-actuated, micro-adaptive flow control system installed along and flush to the upper surface of a wing upstream from a control surface.
Figure 9:
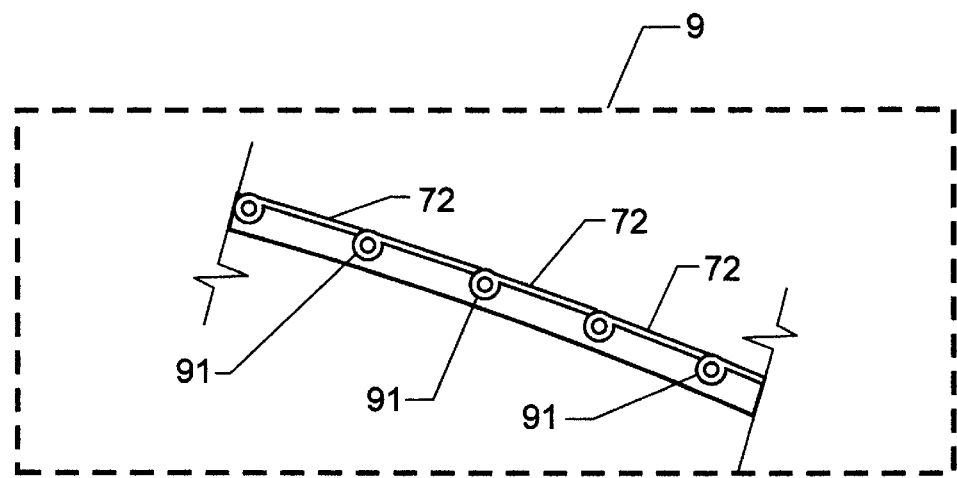
FIG. 9 is a partial side sectional view of the self-actuated, micro-adaptive flow control system detailing the microslat mechanism and hinging.

Referring now to FIG. 8, an airfoil section 62 is shown with the array 71 located ahead, upstream of the aileron 73. As depicted here, the array is closed and flush with the wing surface producing no drag or change of flight characteristics. The detail of the microslats 72, inside dashed box 9, may be seen in FIG. 9. Each microslat 72 is mounted on a hinge 91. The hinge is constructed using a torsional spring material so that each microslat is held shut (flush) under a weak spring force. The microslat itself is bonded to the hinge and made of a stiff flexible material. In the preferred embodiment, the hinge is a hollow thin steel rod with a fixed attachment on one end and a rotatable attachment on the other. The rod can be then twisted through small angles, approximately 450, with only a small force. A thin strip of plastic is bonded to the rod forming hinge 91.

Figure 10:
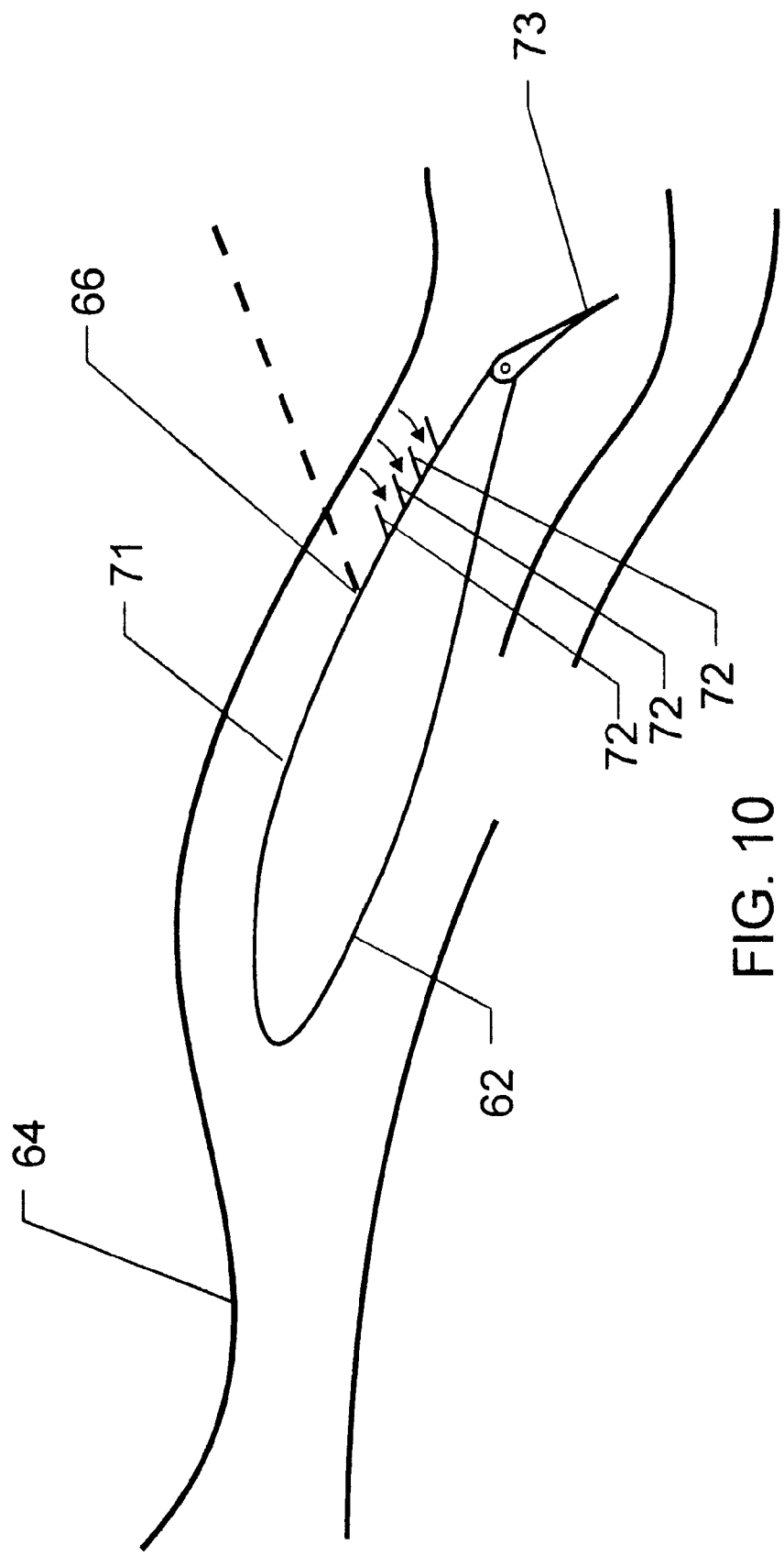
FIG. 10 is a sectional side view showing the self-actuated, micro-adaptive flow control system operating with a deflected control downstream from the system.

FIG. 10 depicts operation of the invention during aileron deflection. When the aileron 73 is deflected at high angles-of-attack, the resulting local increase in angle-of-attack of airfoil 62 produces a separated flow region downstream of the separation point 66. Upstream of the separation point 66, the main flow 64 remains relatively undisturbed and, as a result, the microslats on array 71 are not actuated. In the separation region, microslats 72 open as shown to restrict reverse flow creating a continued attached flow 102. The invention solves the problem of aileron-induced induced stalls without the parasite drag of fixed vortex generators. As the microslats are self-actuated, it also solves this problem without the complexity of extendable/retractable flow control devices such as retractable vortex generators. Further, the microslat arrays operate only when needed and only to the extent needed, one or many microslats may open as the flow requires.

The features and advantages of the invention are numerous. The invention provides an innovative way to make use of the flow separation itself to control flow separation. Verification of the process may be seen by observing oil and chemical flow visualization techniques used in aerodynamic experiments. Careful observations show that the oil or chemicals painted on the surface of models flow in two opposite directions in the presence of flow separation. Upstream of the flow bifurcation region, as shown in FIG. 6 by the dashed line, the chemical moves in the direction of the stream, but downstream beyond the bifurcation region, the chemicals move upstream (against the flow). The presence of this reverse-flow shear is of sufficient strength to push the chemicals upstream even at high angles of attack (when they are pushed not just upstream, but also against gravity). The presence of a strong reverse-flow shear stress phenomenon shows the presence of a significant force which actuates the micro-thin, light-weight arrays of slats. As these microslats are shaped to follow the curvature of the wing, fuselage, hull or other vehicle surface. There is no parasite drag while the devices are closed. The micro-thin slats of various shapes and sizes will be spring-loaded and hinged to the body (hinges will lie buried under the surface) at different chord and span locations and staggered for optimum performance. The size, shape, inter-slat gap, and stagger is optimized for specific expected flow conditions depending on the location of the array. Use of the microslats provide reduced wingtip vortices, reduced noise emission at landing and take-off, and increased lift producing characteristics because of a significant reduction in flow from the high-pressure lower surface to the upper suction side through the gap when flaps and control surfaces are deflected.

In the presence of attached flow, the downstream end of the microslat will be at a pressure higher than at the hinge location and hence they will lie in surface-hugging position producing no drag. They will raise only when actuated by reverse flow caused by separation. The raised microslat will then result in better mixing with the external stream and immediately suppress the flow separation. When the flow separation is thus suppressed, the slats also subside. Thus they respond by raising only when actuated by flow separation. Experiments show that flow separation is generally characterized by low-frequency oscillations. Hence the raising and lowering of the microslats occurs at low frequencies, well within the structural capabilities of the light materials.

Although the invention has been described relative to a specific embodiment thereof, there are numerous variations and modifications that will be readily apparent to those skilled in the art in the light of the above teachings. Specifically, the shape and location of arrays must be adapted to each particular type of aircraft. The particular array shapes herein are illustrative only for the purpose of explanation. It is therefore to be understood that, within the scope of the appended claims, the invention may be practiced other than as specifically described.

What is claimed as new and desired to be secured by Letters Patent of the United States is:

1. A localized, self-actuated and directionally oriented flow control system comprising:
    a grouped array of contiguous microslats for attachment to an aerodynamic surface forming a plurality of rows;
    a plurality of hinges mounted in said array; and
    a plurality of said contiguous microslats mounted on said hinges.

2. A localized, self-actuated and directionally oriented, flow control system as in claim 1 wherein said contiguous microslats have a rectangular planform.

3. A localized, self-actuated and directionally oriented, flow control system as in claim 1 wherein said plurality of hinges comprises a plurality of hollow steel tubes fixed at a first end to said array and free to twist at a second end.

4. A localized, self-actuated and directionally oriented, flow control system as in claim 3 wherein said hollow steel tubes are torsional tubes providing a weak spring force to close said hinges.

5. A localized, self-actuated and directionally oriented, flow control system as in claim 1 wherein said plurality of contiguous microslats comprise a plurality of rectangular microslats arranged in staggered rows.

6. A localized, self-actuated and directionally oriented, flow control system as in claim 1 wherein said plurality of contiguous microslats comprise a plurality of triangular microslats arranged in staggered rows.

7. A localized, self-actuated and directionally oriented, flow control system as in claim 6 wherein said triangular microslats arc formed in the shape of wide-base isosceles triangles having the base attached to said plurality of hinges.

8. A localized, self-actuated and directionally oriented, flow control system as in claim 1 wherein said plurality of contiguous microslats comprise a two-layer configuration having an upper layer of contiguous microslats mounted on top of a lower layer of contiguous microslats.

9. A localized, self-actuated and directionally oriented, flow control system as in claim 8 wherein said upper layer of contiguous microslats are comprised of smaller contiguous microslats compared to the lower layer of contiguous microslats.

10. A localized, self-actuated and directionally oriented, flow control system as comprising:

a grouped array of contiguous microslats for attachment to an aerodynamic surface, said array having a plurality of rows;

a plurality of first torsional spring-loaded hinges attached to said array and located with each row;

a plurality of first microslats, each first microslat attached to one of said plurality of torsional, spring-loaded hinges;

a plurality of second, torsional spring-loaded hinges, each second hinge attached to one of said first microslats; and a plurality of second microslats, each second microslat attached to one of the plurality of second hinges.

* * * * *